QUADRATURE PHASE DETECTOR EMPLOYING TRANSISTOR SWITCHING MEANS

Filed Dec. 1, 1961 2 Sheets-Sheet 1

INVENTOR.
DONUIL A. HILLIS
BY
Walter J. Adam
ATTORNEY

QUADRATURE PHASE DETECTOR EMPLOYING TRANSISTOR SWITCHING MEANS

Filed Dec. 1, 1961 2 Sheets-Sheet 2

INVENTOR
DONUIL A. HILLIS,
BY
Walter J. Adam
ATTORNEY

United States Patent Office 3,119,064
Patented Jan. 21, 1964

3,119,064

QUADRATURE PHASE DETECTOR EMPLOYING TRANSISTOR SWITCHING MEANS

Donuil A. Hillis, Los Angeles, Calif., assignor to Hughes Aircraft Company, Culver City, Calif., a corporation of Delaware Filed Dec. 1, 1961, Ser. No. 156,251
3 Claims. (Cl. 324—83)

This invention relates to voltage and phase detectors and particularly to a quadrature voltage detector including an improved bi-directional switch.

In automatic testing operations, it is often required to examine an incoming sinusoidal signal for its sine or quadrature components as compared to a reference signal which may have the same frequency. In order to perform this quadrature voltage detection, a switch is required that will pass a relatively large current in either direction as a storage device is charged toward a steady state value. Also, the switch must exhibit a minimum voltage drop in both directions so that small amounts of current flowing to or from the storage device will not be appreciably diminished. It is further required that the switch exhibit a very low leakage during off conditions so that reliable sampling may be performed, for example. Conventional switching arrangements may utilize two transistors coupled in series but have the inherent disadvantage that the signal current must pass through one or both transistors in the inverse direction, in which condition the transistor has an extremely small current gain. The result of this low current gain is that the control current must have the same order of magnitude as the signal current. Another disadvantage of conventional series coupled transistor arrangements is the typical low voltage breakdown of the base to emitter junctions which limits the operating range of the switch.

It is therefore an object of this invention to provide an improved and highly accurate quadrature voltage detector.

It is a further object of this invention to provide a quadrature voltage detector circuit utilizing an improved bi-directional switch.

It is another object of this invention to provide a bi-directional switch that will pass a relatively large current in either direction in a minimum of time when biased into conduction and will provide a relatively high impedance when biased out of conduction.

It is still another object of this invention to provide a bi-directional switch that in response to a minimum control current passes a relatively large current in both directions with a relatively low impedance when biased into conduction and provides a minimum of current leakage when biased out of conduction.

Briefly, this invention includes a quadrature voltage detecting circuit that responds to the phase and amplitude of a signal in comparison to the phase of a reference signal. The circuit is highly reliable and accurate because of an improved bistable circuit that passes a relatively high current in either direction with a relatively low impedance when biased into conduction and presents a relatively high impedance to current flow in both directions when biased out of conduction. The bistable circuit includes first and second transistors having load current paths series coupled in opposite directions to a common point. First and second diode means are coupled across the load current paths to provide low impedance current flow in either direction through the switch when the transistors are biased into conduction and to effectively block current flow when the transistors are biased out of conduction.

The novel features of this invention, as well as the invention itself, both as to its organization and method of operation, will best be understood from the accompanying description taken in connection with the accompanying drawings, in which like characters refer to like parts, and in which.

Figure 1:
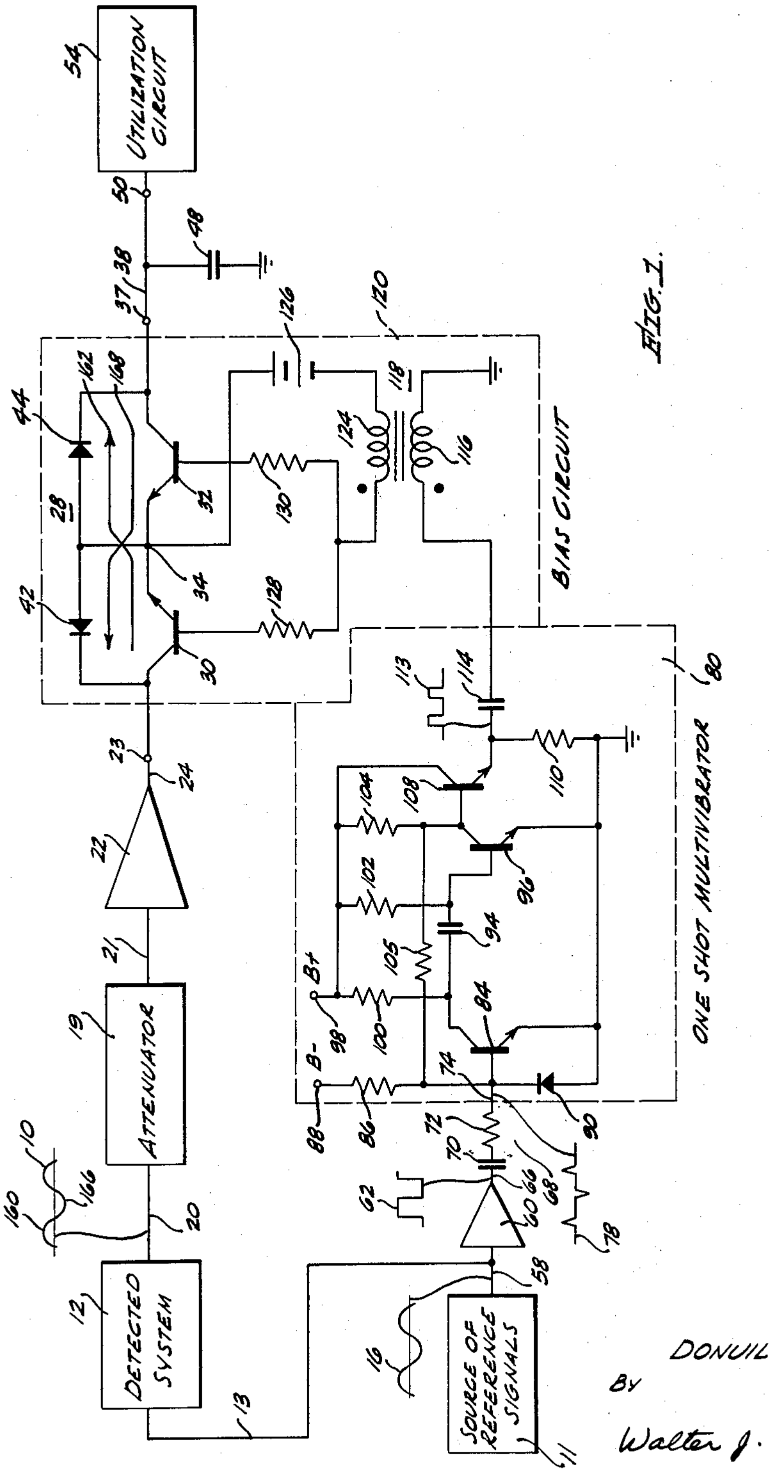
FIG. 1 is a schematic circuit diagram of the quadrature detector circuit and switch in accordance with this invention.

As shown in FIG. 1, the function of the quadrature voltage detector in accordance with this invention is to examine the phase of a signal shown by a waveform 10 which is formed from a signal of a waveform 16 after being applied through a lead 13 and through a circuit or system 12. The system 12 which provides a phase shift or gain may be an amplifier to be tested, for example. It is to be noted that the circuit of FIG. 1 may be utilized to measure phase shift or, if the phase shift is known, may be utilized to measure gain. Thus the voltage detector in accordance with this invention, may be utilized to determine the phase of the signal of the waveform 10 with respect to the phase of the reference signal of the waveform 16. The signal of the waveform 10 is applied on a lead 20 to an attenuator 19, through a lead 21 to a D.C. (direct current) amplifier 22 and to a lead 24 to a bi-directional switch 28. The attenuator may be a conventional adjustable voltage divider arrangement. Transistors 30 and 32 both of the n-p-n type are provided in the switch 28 with the emitters thereof coupled to a common point 34. The collector of the transistor 30 is coupled to a terminal 23 and the lead 24 and the collector of the transistor 32 is coupled to a terminal 37 and an output lead 38. To provide current conduction from the common point 34 in either direction a unidirectional device such as a diode 42 has an anode to cathode path coupled from the point 34 to the lead 24 and a unidirectional device such as a diode 44 has an anode to current path coupled from the point 34 to the output lead 38. The diodes 42 and 44 may be conventional semiconductor diodes, for example, preferably having high conductance, a fast switching response and a small leakage current when biased in the reverse direction.

The output lead 38 is coupled to a first plate of a storage capacitor 48 having a second plate coupled to ground with the capacitor 48 maintaining a potential representative of the phase and amplitude comparison of the signals of the waveforms 10 and 16. The lead 38 is also coupled to a terminal 50 which in turn is coupled to a utilization circuit 54, for example, which may be a meter to sample or continuously respond to the voltage stored on the capacitor 48. It is to be noted that the signal appearing at the output of the D.C. amplifier 22 may be calibrated by the attenuator 19 to cause the output signal across the capacitor 48 to be a D.C. voltage proportional to the sine of the phase difference angle between the signal of the waveform 10 and the reference signal of the waveform 16.

For switching the bistable circuit 28 so as to determine the phase or amplitude of the signal of the waveform 10, the reference signal of the waveform 16 is applied from the source 11 through a lead 58 to an amplifier 60 which may be a high gain amplifier adjusted to saturate in response to the signal of the waveform 16. Thus, a substantially square wave of a waveform 62 is applied through a lead 46 to a differentiation circuit 68. A capacitor 70 and a resistor 72 are coupled in series between the lead 66 and a lead 74 to differentiate the square waves of the waveform 62 to form a signal of the waveform 78.

A one shot multivibrator circuit 80 is coupled to the lead 74 to respond to the positive pulse of the differentiated signal of the waveform 78. The multivibrator circuit 80 may include an n-p-n type transistor 84 having a base coupled to the lead 74, coupled through a resistor 86 to a B— source of potential such as terminal 88 and coupled to ground through the cathode to anode path of a diode 90 for providing a fixed bias to the base of the transistor 84. The emitter of the transistor 84 is coupled to ground and the collector is coupled through a coupling capacitor 94 to the base of an n-p-n type transistor 96. The collector of the transistor 84, the base of the transistor 96 and the collector of the transistor 96 are coupled to a positive source of B+ potential such as a terminal 98 through respective resistors 100, 102 and 104. The emitter of the transistor 96 is coupled to ground and the collector is also coupled to the base of the transistor 84 through a resistor 105 for providing a feedback multivibrator operation. The collector of the transistor 96 is further coupled to the base of an n-p-n type transistor 108 having a collector coupled to the terminal 98 and an emitter coupled through a resistor 110 to ground. The emitter of the transistor 108 is also coupled through a coupling capacitor 114 to a first winding 116 of a transformer 118 of a bias circuit 120. The other end of the winding 116 is coupled to ground.

A second winding 124 of the transformer 118 has one end coupled to a negative source of potential such as a battery 126 and the other end coupled both through a resistor 128 to the base of the transistor 30 and through a resistor 130 to the base of the transistor 32 for providing switching control. The positive terminal of the battery 126 is coupled to the common point 34 for providing reference potential for the switching operation.

Before further explaining the operation of the circuit of FIG. 1, reference will be made to the circuit of FIG. 2 for explaining a bi-directional switch 136 in accordance with the invention which may be utilized instead of the switch 28 of FIG. 1. A first transistor 138 and a second transistor 140 both of the p-n-p type are provided having emitters coupled to a common junction 144. The lead 24 and the terminal 23 may be coupled to the collector of the transistor 138 and the output lead 38 and the terminal 37 may be coupled to the collector of the transistor 140. For providing the low impedance path in either current direction when the switch is biased into conduction and a high impedance path when the switch is biased out of conduction, a first unidirectional device such as a first diode 148 has an anode to cathode path coupled between the collector of the transistor 138 and the common point 144 and a second unidirectional device such as a second diode 150 is provided having an anode to cathode path coupled between the collector of the transistor 140 and the common junction point 144. The diodes 148 and 150 may be selected to have high conductive, fast switching and low leakage characteristics. The transformer 118 has a winding 128 with a first end coupled to the positive terminal of a source of potential such as a battery 150 and the other end coupled both through a rseistor 152 to the base of the transistor 138 and through a resistor 154 to the base of the transistor 140. The negative terminal of the battery 150 is coupled to the common point 144 so as to provide a reference potential of the opposite polarity from the bistable switch 28 utilizing transistors of the opposite conductivity type.

Figure 3:
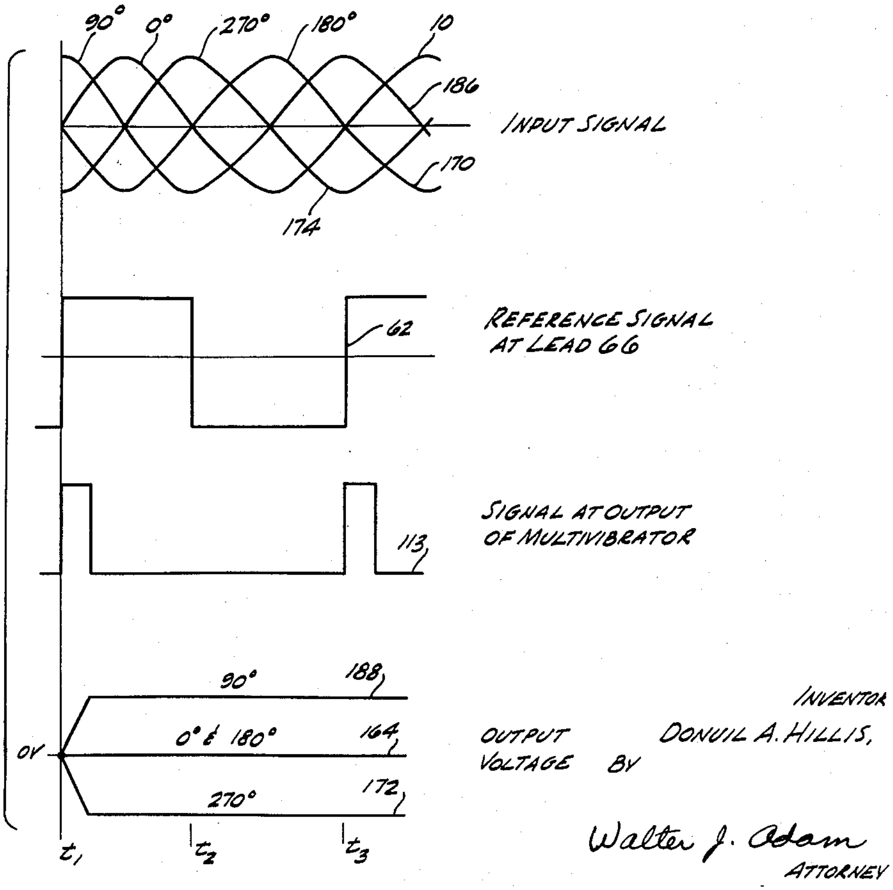
FIG. 3 is a diagram of waveforms showing voltage versus time for further explaining the operation of the quadrature detector of FIG. 1.

Referring now to FIGS. 1 and 3, it may be seen that the reference signal of the waveform 16 is applied to the saturating amplifier 60 to form the square wave of the waveform 62 which in turn is differentiated in the differentiating circuit 68 to form the differentiated signal of the waveform 78. In the multivibrator 80 the transistor 84 is normally biased out of conduction by the dividing operation of the resistor 86 and the diode 90. The transistor 96 is normally maintained biased in conduction and the transistor 108 is maintained in the nonconductive state. Upon application of a positive trigger signal of the waveform 78, the transistor 84 is biased into conduction, the transistor 96 is biased out of conduction and the transistor 108 is biased into conduction to form a short duration sampling or switching pulse of the waveform 113. As is well known in the art, upon termination of the trigger pulse of the waveform 78, the transistor 84 is again biased out of conduction, the transistor 96 is biased into conduction and the transistor 108 is biased out of conduction to terminate the sampling pulse of the waveform 113. The bias circuit 120 then responds to the positive sampling pulse of the waveform 113 to apply a positive signal simultaneously to the bases of the transistors 30 and 32, which causes both transistors to be biased or switched into full conduction as the base potential is positive relative to the potential applied to the emitter from the common point 34. The signal of the waveform 16 after being applied through a system 12 for detecting phase shift or gain is varied in phase and amplitude to form the signal of the waveform 10 on the lead 20. The signal of the waveform 10 after being amplified a desired amount in the amplifier 22 is applied to the lead 24 and through the switch 28, when biased into conduction, to the capacitor 48.

Because the signal of the waveform 10 has positive and negative polarities, the switch 28 must rapidly pass current in either direction therethrough. In response to a positive alternation 160 of the waveform 10, occurring at the time that the switch 28 is closed or biased into conduction, current may flow from the circuit 12 or from the amplifier 22 through the collector to emitter of the transistor 30 and through the anode to cathode path of the diode 44 as shown by an arrow 162. In response to a negative alternation 166 of the waveform 10, occurring at the time that the switch 28 is closed, current may flow from the capacitor 48 through the lead 38, through the collector to emitter path of the transistor 32 and through the anode to cathode path of the diode 42 to the amplifier 22 or to circuit 12 as shown by an arrow 168. When current flows through the switch 28 such as in the path 162 a very low impedance is presented thereto because of the low voltage drop across the transistor 30 and the diode 44. Also, it is to be noted that because of the low impedance of the switch 28 a relatively large current may be passed through the switch 28 in either direction. Also a relatively small current may be accurately passed therethrough such as when the capacitor 38 is charged near to a final voltage as the switch 28 exhibits a minimum voltage difference thereacross.

At the termination of the positive pulses of the waveform 113 the base of the transistors 30 and 32 are biased negative relative to the emitters thereof so as to be nonconductive or switched off. Thus, current in response to the positive alternation 160 of the waveform 10 is prevented from flowing to the lead 38 both by the high impedance between collector and emitter of the transistor 30 and by the high impedance of the diode 42 when back biased. Also, in response to the negative alternation 166 of the waveform 10 current is prevented from flowing to the lead 24 and the lead 20 such as from the storage capacitor 48 by high impedance of the transistor 32 when biased out of conduction and by the high impedance of the back biased diode 44 between the cathode and anode thereof. Therefore, because of the arrangement of the diodes and transistor, the bidirectional switch 28 has a very low leakage current when biased out of conduction.

Thus, in the operation of the circuit of FIG. 1 the signal of the waveform 10 is sampled in response to the short duration pulses of the waveform 113 which may for example have a 1 microsecond width when the input signal has a frequency of 800 cycles per second. At a time $t_1$, FIG. 3, the signal of the waveform 113 formed at the leading edge of the squares pulse of the waveform 62 is applied to the biasing circuit 120 to bias the transistors 30 and 32 into conduction. Thus, if the signal being sampled has a zero degree phase difference after passing through the circuit 12 as shown by the waveform 10, effectively zero current flows through the switch 28. Thus, the potential applied to the terminal 50 may have a zero voltage value as shown by a waveform 164. If the reference signal of the waveform 16 has been phase shifted 90 degrees in the circuit 12 as shown by a waveform 186 and the switch 28 is opened in response to the sampling pulse and the waveform 113, current flows through the switch 28 in the path shown by the arrow 162 to rapidly charge the storage capacitor 48. Thus, at the termination of the pulse of the waveform 113 shortly after time $t_1$, the storage capacitor 48 is charged to a positive value shown by a waveform 188. It is to be noted that because the switch 28 passes a relatively large current with a low impedance, the charge on the capacitor 40 is rapidly changed. If the signal of the waveform 16 is phase shifted in the circuit 12 by 180 degrees as shown by a waveform 170, essentially zero current is also applied through the switch 28 to form a charge on the capacitor 48 as shown by the waveform 164. Thus the signal of the waveform 164 is stored on the capacitor 48. Also if the signal of the waveform 16 is phase shifted 270 degrees as shown by a waveform 174, a negative signal is formed shortly after time $t_1$ on the capacitor 48 in response to current flowing in the path of the arrow 168, as shown by a waveform 172. Thus in response to the signal of the waveform 186 the switch 28 conducts current in the path of the waveform 162 and in response to the signal of the waveform 174 the switch 28 conducts current in the opposite direction of the path shown by the arrow 168. The amplitude of the signal such as shown by the waveforms 10 and 174 may be detected by the amplitude of the signals of the waveforms 188 and 172. The attenuator 19 is adjusted so that the signal stored on the capacitor 48 is proportional to the sine of the phase difference angle between the signals of the waveforms 10 and 16. Thus by adjusting the amplitude of the signal of the waveform 10, the phase thereof may be determined. Also if the phase of the signal of the waveform 10 is known, the amplitude thereof may be determined in accordance with this invention. It is to be noted that the circuit of FIG. 1 is a quadrature phase detector for determining the sine or quadrature of a signal because the signals of the waveforms 188, 164 and 172 change a small amount in amplitude with a large degree of phase change relative to that of the reference signal of the waveform 16.

At time $t_2$ the switch 28 is maintained biased out of conduction and because of low leakage of the bidirectional switch 28, the amplitude of the output signals such as the waveform 188 is not effectively changed as current is not allowed to leak from the capacitor 48. At time $t_3$ in response to the sampling pulse of the waveform 113 a signal such as shown by the waveform 10 is again sampled to maintain the same charge on the capacitor 48 which may be metered or read at any time by the circuit 54 for example.

Figure 2:
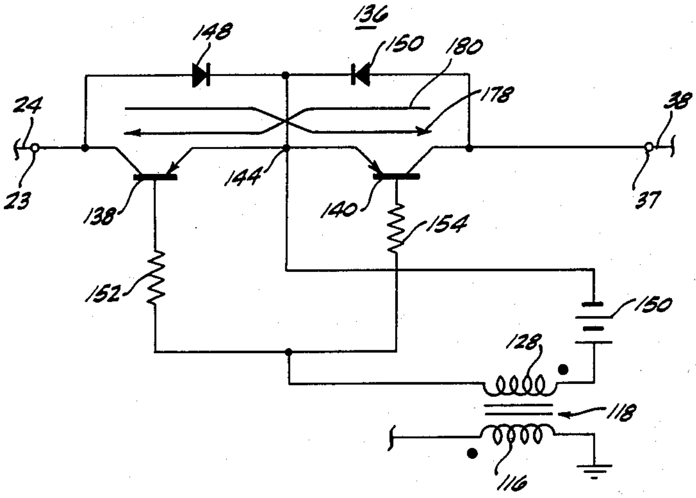
FIG. 2 is a schematic circuit diagram of another bi-directional switch in accordance with the invention that may be utilized in the circuit of FIG. 1.

The bidirectional switch of FIG. 2 operates in a similar manner except in response to a positive signal on the lead 28 when the switch is closed or biased into conduction, current flows through the diode 148 and through the emitter to collector path of the transistor 140 as shown by an arrow 178 and in response to a negative signal at the lead 28 current flows through the diode 50 and the emitter to collector path of the transistor 138 as shown by the arrow 180. Also, as discussed previously, the transformer 118 applies negative pulses to the bases of the transistors 138 and 140 when the switch is closed.

It is to be noted that the bidirectional switch in accordance with this invention may be utilized in other arrangement than the quadrature phase detector of FIG. 1 within the principles of this invention. For example, the bidirectional switch may be utilized with other type signals such as D.C. (direct current) signals where bidirectional current may flow therethrough.

Thus, there has been described an improved and highly sensitive quadrature detecting circuit to compare the phase of a signal with the phase of a second signal. Also the amplitude of a signal may be determined if the phase condition is known. Also there has been described an improved high current bidirectional switch that presents a low impedance to current flow in either direction when biased into conduction and presents a relatively high impedance to current flow in either direction when biased out of conduction. Therefore, the bidirectional high current switch because of its low impedance when closed and because of its high impedance when open will reliably and accurately gate signals over a wide range of current variation.

What is claimed is:

1. A quadrature phase detector for determining the phase of a first alternating signal from a first source of signals relative to the phase of a second alternating signal from a second source of signals comprising first and second transistors each having an emitter, a collector and a base with the emitters of said first and second transistors coupled together and the collector of said first transistor coupled to the first source of signals, capacitor means coupled to the collector of said second transistor, bias means coupled to the bases of said first and second transistors and to the emitters of said first and second transistors, a first diode coupled between the emitter and collector of said first transistor, a second diode coupled between the emitter and collector of said second transistor, said first and second transistors and said first and second diodes providing a switch for passing current in either a first or a second direction when switched into conduction, current passing in said first direction through the collector and emitter of said first transistor and through said second diode and current passing in said second direction through the collector and emitter of said second transistor and through said first diode, and means coupled between said second source of signals and said bias means for responding to selected amplitudes of the second alternating signals to apply switching signals to said bias means and switch said transistors into conduction so as to apply current through said switch in either said first or said second direction to form a charge on said capacitor means representative of the relative phase of said first alternating signal.

2. A detecting circuit for responding to the phase and amplitude of a first signal from a first source of signals relative to the phase of a second signal from a second source of signals comprising first and second transistors each having an emitter, a collector and a base, the emitters of said first and second transistors coupled together and the collector of said first transistor coupled to said first source of signals, a first diode having an anode to cathode path coupled between the emitter and collector of said first transistor, a second diode having an anode to cathode path coupled between the emitter and collector of said second transistor, storage means coupled to the collector of said second transistor, pulse forming means coupled to said second source of signals, differentiation means coupled to said pulse forming means, multivibrator means coupled to said differentiation means, and bias means coupled between said multivibrator means and the bases of said first and second transistors for switching said first and second transistors into conduction, the emitters of said first and second transistors being coupled to said bias means for providing a reference potential thereto, whereby in response to a signal from said first source, said first and second transistors are biased into conduction to apply said first signal from said first source to said storage means with current passing in either direction between said first source and said storage means, said storage means maintaining a potential representative of the phase of said first signal relative to the phase of said second signal.

3. A quadrature phase detector for determining the phase of a first alternating signal from a first source of signals relative to the phase of a second alternating signal from a second source of signals comprising first and second transistors each having an emitter, a collector and a base with the emitters of said first and second transistors coupled together and the collector of said first transistor coupled to the first source of signals, capacitor means coupled to the collector of said second transistor, bias means coupled to the bases of said first and second transistors and to the emitters of said first and second transistors, a first diode coupled between the emitter and collector of said first transistor, a second diode coupled between the emitter and collector of said second transistor, said first and second transistors and said first and second diodes providing a switch for passing current in either a first or a second direction when switched into conduction, current passing in said first direction through the collector and emitter of said first transistor and through said second diode and current passing in said second direction through the collector and emitter of said second transistor and through said first diode, pulse forming means coupled to said second source of signals, differentiation means coupled to said pulse forming means to form a trigger signal, and multivibrator means coupled between said differentiation means and said bias means for applying a switching signal thereto to switch said transistors into conduction so as to pass current through said switch in either said first or second direction from said first source of signals to form a charge on said capacitor means representative of the relative phase of said first alternating signal relative to the phase of said second alternating signal.

References Cited in the file of this patent

UNITED STATES PATENTS

| | | |
|---|---|---|
| 2,862,180 | Smith | Nov. 25, 1958 |
| 2,907,932 | Patchell | Oct. 6, 1959 |
| 2,984,786 | Walker | May 16, 1961 |
| 3,005,151 | Ule | Oct. 17, 1961 |
| 3,013,162 | Antista | Dec. 12, 1961 |
| 3,042,872 | Brahm | July 3, 1962 |

UNITED STATES PATENT OFFICE

CERTIFICATE OF CORRECTION

Patent No. 3,119,064 January 21, 1964

Donuil A. Hillis

It is hereby certified that error appears in the above numbered patent requiring correction and that the said Letters Patent should read as corrected below.

Column 2, line 71, for "46" read -- 66 --; column 3, line 63, for "rseistor" read -- resistor --.

Signed and sealed this 30th day of June 1964.

(SEAL)
Attest:

ERNEST W. SWIDER
Attesting Officer

EDWARD J. BRENNER
Commissioner of Patents